United States Patent
Yang

(10) Patent No.: US 6,471,875 B1
(45) Date of Patent: Oct. 29, 2002

(54) DEVICE AND METHOD OF DELAYING WATER DEOXIDATION

(76) Inventor: Ching-Chiuan Yang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/968,049

(22) Filed: Sep. 28, 2001

(51) Int. Cl.⁷ .................................................. C02F 1/48
(52) U.S. Cl. ........................ 210/749; 210/695; 210/153; 210/232; 210/258
(58) Field of Search ................................ 210/695, 153, 210/232, 258, 749

(56) References Cited

U.S. PATENT DOCUMENTS 3,856,671 A * 12/1974 Lee et al.
5,904,851 A *  5/1999 Taylor et al.
6,017,447 A *  1/2000 Wright et al.

* cited by examiner

Primary Examiner—Betsey Morrison Hoey

(57) ABSTRACT

A device for delaying water deoxidation has a main container, a motor disposed in the main container, a magneto-oscillator disposed in the main container, a pressure bottle disposed in the main container, a first water tube, a first non-return valve connected to the first water tube, a first three-way joint connected to the first non-return valve, a second water tube connected to the first three-way joint and the motor, a third water tube connected to the motor, a second three-way joint connected to the third water tube, a fourth water tube connected to the second three-way joint, a second non-return valve connected to the fourth water tube, a fifth water tube connected to the second non-return valve, a third non-return valve connected to the fifth water tube, a mixer connected to the fifth water tube, a first water inlet pipe connected to the mixer, the magneto-oscillator connected to the first water inlet pipe, a first water outlet pipe connected to the magneto-oscillator, and a second water inlet pipe connected to the first water outlet pipe.

6 Claims, 5 Drawing Sheets

DEVICE AND METHOD OF DELAYING WATER DEOXIDATION

BACKGROUND OF THE INVENTION

The present invention relates to a water treatment method. More particularly, the present invention relates to a device and method of delaying water deoxidation.

An original water is often deoxidated quickly by water pollutants. There are many kinds of chemical water treatment methods to delay water deoxidation. However, the chemical water treatment methods need many expensive chemicals.

SUMMARY OF THE INVENTION

An object of the present invention is to provide a device and method of delaying water deoxidation with a physical water treatment method in order to save chemicals.

Accordingly, a device for delaying water deoxidation comprises a main container having a hollow interior, a motor disposed in the main container, a magneto-oscillator disposed in the main container, a pressure bottle disposed in the main container, a first water tube, a first non-return valve connected to the first water tube, a first three-way joint connected to the first non-return valve, a second water tube connected to the first three-way joint and the motor, a third water tube connected to the motor, a second three-way joint connected to the third water tube, a fourth water tube connected to the second three-way joint, a second non-return valve connected to the fourth water tube, a fifth water tube connected to the second non-return valve, a third non-return valve connected to the fifth water tube, a mixer connected to the fifth water tube, a first elastic connector connected to the mixer, a first water inlet pipe connected to the first elastic connector, the magneto-oscillator connected to the first water inlet pipe, a first water outlet pipe connected to the magneto-oscillator, a second elastic connector connected to the first water outlet pipe, a second water inlet pipe connected to the second elastic connector, the pressure bottle connected to the second water inlet pipe, a second water outlet pipe connected to the pressure bottle, a sixth water tube connected to the second water outlet pipe, a gas release valve connected to the second water outlet pipe, a hot air tank connected to the first three-way joint, a hot air adjusting valve disposed on the hot air tank, a fan disposed in the motor, a hot air pipe connected to the motor and the hot air tank, and a third non-return valve connected to the hot air pipe.

DETAILED DESCRIPTION OF THE INVENTION

Figure 1:
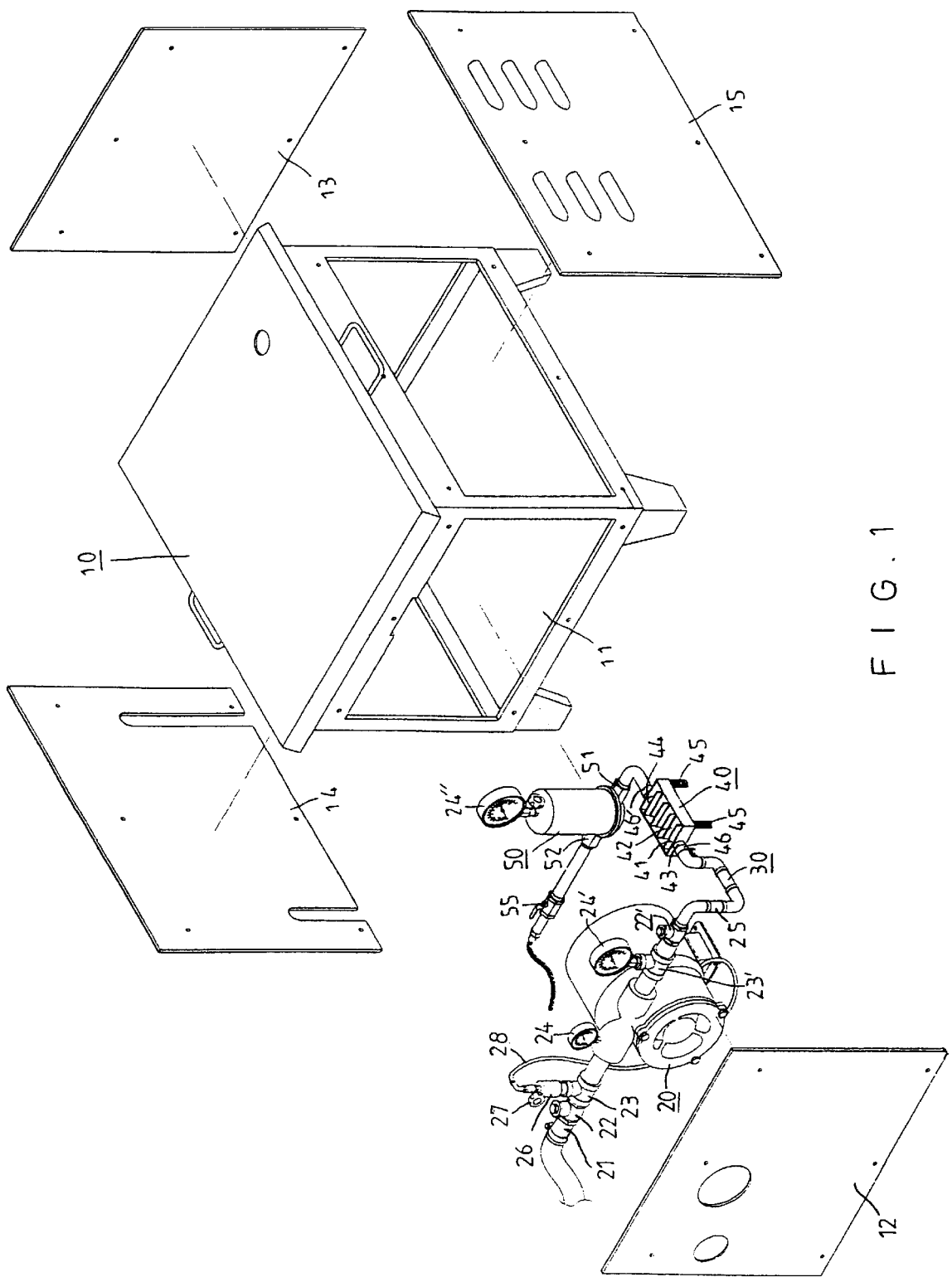
FIG. 1 is a perspective exploded view of a device for delaying delaying water deoxidation of a preferred embodiment in accordance with the present invention.
Figure 2:
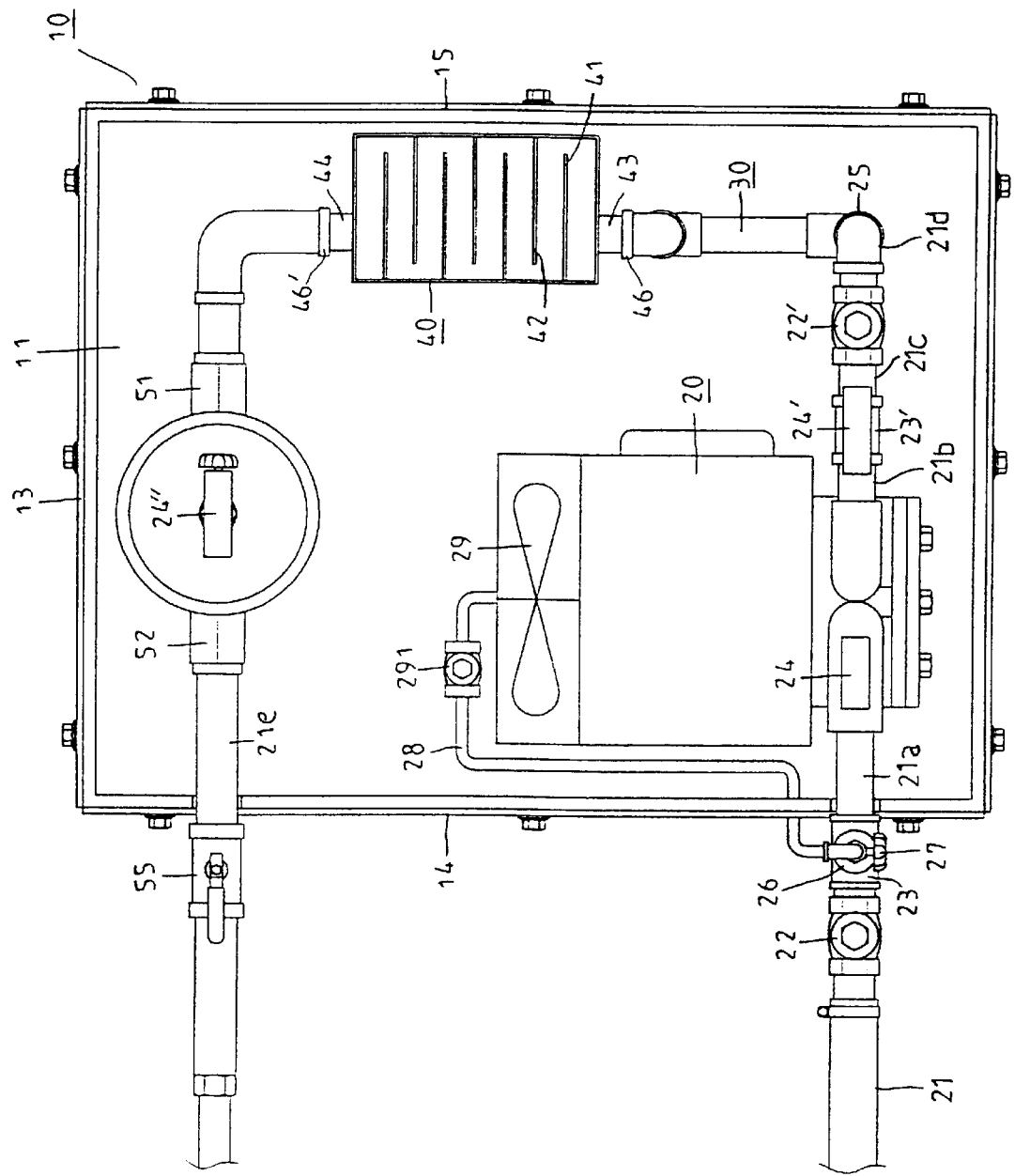
FIG. 2 is an elevational assembly view of a device for delaying water deoxidation of a preferred embodiment in accordance with the present invention.
Figure 3:
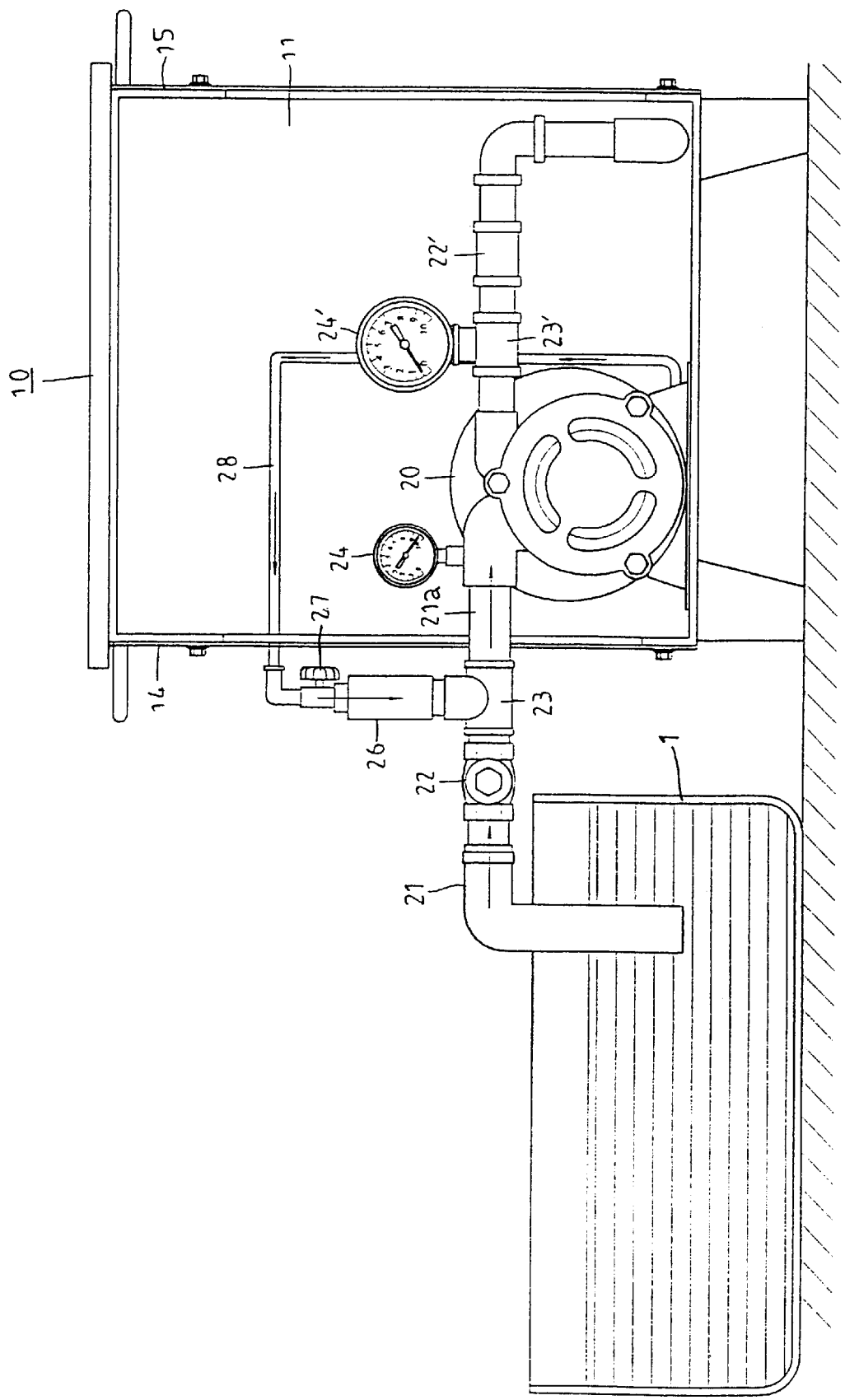
FIG. 3 is a schematic view illustrating an operation of a motor of a preferred embodiment in accordance with the present invention.
Figure 4:
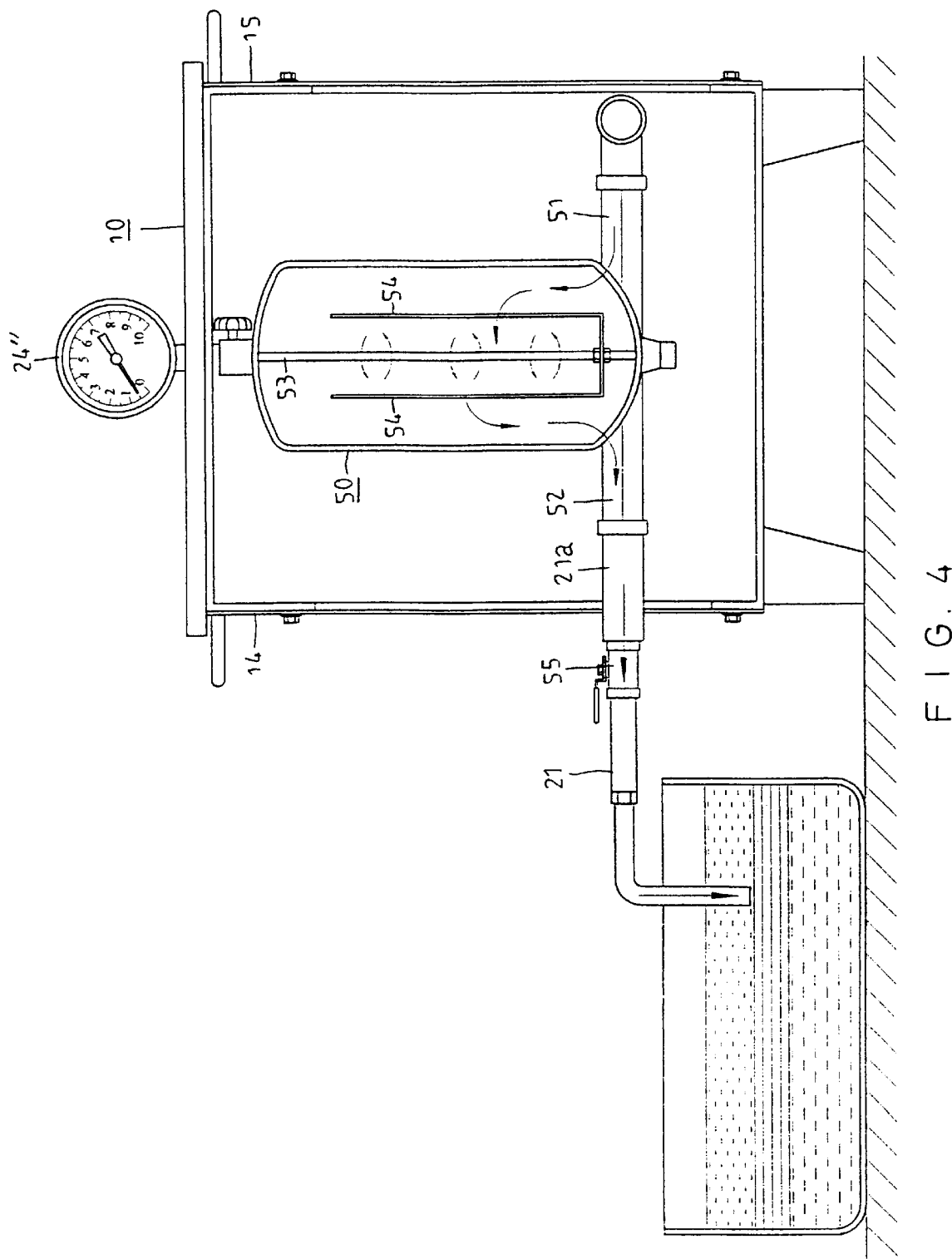
FIG. 4 is a schematic view illustrating an operation of a pressure bottle of a preferred embodiment in accordance with the present invention.
Figure 5:
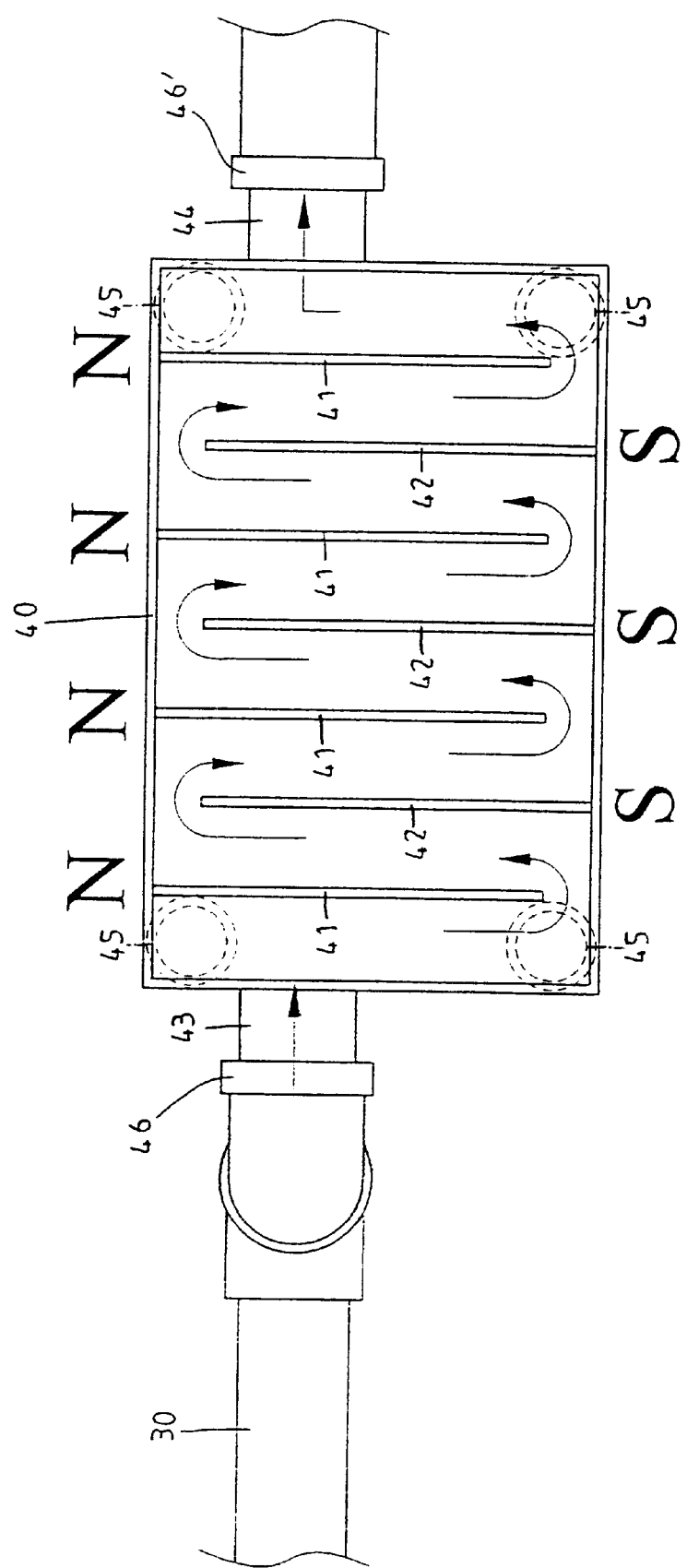
FIG. 5 is a schematic view illustrating an operation of a magneto-oscillator of a preferred embodiment in accordance with the present invention.

Referring to FIGS. 1 to 5, a device for delaying water deoxidation: comprises a main container 10 having a hollow interior 11, a motor 20 disposed in the main container 10, a magneto-oscillator 40 disposed in the main container 10, a pressure, bottle 50 disposed in the main container 10, a first water tube 21, a first non-return valve 22 connected to the first water tube 21, a first three-way joint 23 connected to the first non-return valve 22, a second water tube 21a connected to the first three-way joint 23 and the motor 20, a third water tube 21b connected to the motor 20, a second three-way joint 23' connected to the third water tube 21b, a fourth water tube 21c connected to the second three-way joint 23', a second non-return valve 22' connected to the fourth water tube 21c, a fifth water tube 21d connected to the second non-return valve 22', a third non-return valve 25 connected to the fifth water tube 21d, a mixer 30 connected to the fifth water tube 21d, a first elastic connector 46 connected to the mixer 30, a first water inlet pipe 43 connected to the first elastic connector 46, the magneto-oscillator 40 connected to the first water inlet pipe 43, a first water outlet pipe 44 connected to the magneto-oscillator 40, a second elastic connector 46' connected to the first water outlet pipe 44, a second water inlet pipe 51 connected to the second elastic connector 46', the pressure bottle 50 connected to the second water inlet pipe 51, a second water outlet pipe 52 connected to the pressure bottle 50, a sixth water tube 21e connected to the second water outlet pipe 52, a gas release valve 55 connected to the second water outlet pipe 52, a hot air tank 26 connected to the first three-way joint 23, a hot air adjusting valve 27 disposed on the hot air tank 26, a fan 29 disposed in the motor 20, a hot air pipe 28 connected to the motor 20 and the hot air tank 26, a third non-return valve 291 connected to the hot air pipe 28, a first manometer 24 disposed on the motor 20, a second manometer 24' disposed on the second three-way joint 23', and a third manometer 41" disposed on the pressure bottle 50.

The pressure bottle 50 has a center shaft 53 and a plurality of oscillating plates 54.

The magneto-oscillator 40 has a plurality of north-polar magnetic plates 41 and a plurality of south-polar magnetic plates 42.

A first plate 12, a second plate 13, a third plate 14, and a fourth plate 15 covers four sides of the main container 10.

The magneto-oscillator 40 is supported by four lower absorbers 45.

The first water tube 21 is inserted through a water tank 1.

A method of delaying water deoxidation comprises steps of:

adding a neutralizing agent into an original water in the water tank 1 to balance a pH value of the original water, pressurizing the original water in the device of delaying water deoxidation, adding hot air into the original water, mixing the hot air and the original water in the mixer 30, passing the original water through the magneto-oscillator 40, and passing the original water through the pressure bottle 50.

The present invention is not limited to the above embodiment but various modification thereof may be made. Furthermore, various changes in form and detail may be made without departing from the scope of the present invention.

I claim:

1. A device for delaying water deoxidation comprises:
a main container having a hollow interior, a motor disposed in the main container, a magneto-oscillator disposed in the main container, a pressure bottle disposed in the main container, a first water tube, a first non-return valve connected to the first water tube, a first three-way joint connected to the first non-return valve, a second water tube connected to the first three-way joint and the motor, a third water tube connected to the motor, a second three-way joint connected to the third water tube, a fourth water tube connected to the second three-way joint, a second non-return valve connected to the fourth water tube, a fifth water tube connected to the second non-return valve, a third non-return valve connected to the fifth water tube, a mixer connected to the fifth water tube, a first elastic connector connected to the mixer, a first water inlet pipe connected to the first elastic connector, the magneto-oscillator connected to the first water inlet pipe, a first water outlet pipe connected to the magneto-oscillator, a second elastic connector connected to the first water outlet pipe, a second water inlet pipe connected to the second elastic connector, the pressure bottle connected to the second water inlet pipe, a second water outlet pipe connected to the pressure bottle, a sixth water tube connected to the second water outlet pipe, a gas release valve connected to the second water outlet pipe, a hot air tank connected to the first three-way joint, a hot air adjusting valve disposed on the hot air tank, a fan disposed in the motor, a hot air pipe connected to the motor and the hot air tank, and a third non-return valve connected to the hot air pipe.

2. The device for delaying water deoxidation as claimed in claim 1, wherein the pressure bottle has a center shaft and a plurality of oscillating plates.

3. The device for delaying water deoxidation as claimed in claim 1, wherein the magneto-oscillator has a plurality of northpolar magnetic plates and a plurality of southpolar magnetic plates.

4. The device for delaying water deoxidation as claimed in claim 1, wherein the magneto-oscillator is supported by four lower absorbers.

5. The device for delaying water deoxidation as claimed in claim 1, wherein a first manometer is disposed on the motor, a second manometer is disposed on the second three-way joint, and a third manometer is disposed on the pressure bottle.

6. A method of delaying water deoxidation comprising steps of:

adding a neutralizing agent into an original water in the water tank to balance a pH value of the original water, pressurizing the original water in a device of delaying water deoxidation, adding hot air into the original water, mixing the hot air and the original water in a mixer, passing the original water through a magneto-oscillator, and passing the original water through a pressure bottle.

* * * * *